US012656141B2

(12) United States Patent　　(10) Patent No.: US 12,656,141 B2
Kotzor et al.　　(45) Date of Patent: Jun. 16, 2026

(54) METHOD FOR CARRYING OUT A FUNCTION OF A VEHICLE, COMPUTER-READABLE MEDIUM, SYSTEM, AND VEHICLE

(71) Applicant: Bayerische Motoren Werke Aktiengesellschaft, Munich (DE)

(72) Inventors: Daniel Kotzor, Seefeld (DE); Stefan Holder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 126 days.

(21) Appl. No.: 18/560,350

(22) PCT Filed: Apr. 5, 2022

(86) PCT No.: PCT/EP2022/058981
§ 371 (c)(1),
(2) Date: Nov. 10, 2023

(87) PCT Pub. No.: WO2023/274591
PCT Pub. Date: Jan. 5, 2023

(65) Prior Publication Data
US 2024/0230357 A1　　Jul. 11, 2024

(30) Foreign Application Priority Data
Jun. 30, 2021　(DE) ..................... 10 2021 116 781.7

(51) Int. Cl.
*G01C 21/34*　　(2006.01)
(52) U.S. Cl.
CPC ....... *G01C 21/3492* (2013.01); *G01C 21/343* (2013.01)

(58) Field of Classification Search
CPC .......................... G01C 21/3492; G01C 21/343
See application file for complete search history.

(56) References Cited

U.S. PATENT DOCUMENTS

2014/0336965 A1　11/2014　Mori et al.
2019/0215378 A1 *　7/2019　Munishwar ......... H04W 36/322

FOREIGN PATENT DOCUMENTS

CN　　112380906 A　　2/2021
DE　102016102618 A1　8/2016
(Continued)

OTHER PUBLICATIONS

99Labs "Vehicle Location and Dwell Time Prediction Conclusion," May 31, 2021 (Year: 2021).*
(Continued)

*Primary Examiner* — Aryan E Weisenfeld
(74) *Attorney, Agent, or Firm* — Maginot, Moore & Beck LLP

(57) ABSTRACT

A method for performing a function of a vehicle includes determining a current vehicle location of the vehicle. The method also includes determining a probability of a start of a next journey within a time window for each of a set of time windows depending on the determined current vehicle location. A departure time window is predicted for the start of the next journey, wherein the departure time window for the start of the next journey is a time window of the set of time windows for which the determined probability has the highest value. The method further includes performing the function of the vehicle if the determined probability of the predicted departure time window exceeds a predetermined threshold value.

20 Claims, 3 Drawing Sheets

100

102

104

106

108

(56)               References Cited

FOREIGN PATENT DOCUMENTS

| | | | |
|---|---|---|---|
| DE | 102017100398 | A1 | 7/2017 |
| DE | 102016215388 | A1 | 2/2018 |
| DE | 112018007858 | T5 | 4/2021 |

OTHER PUBLICATIONS

International Search Report corresponding to International Patent Application No. PCT/EP2022/058981, dated Jul. 5, 2022 (5 pages).
Written Opinion corresponding to International Patent Application No. PCT/EP2022/058981, dated Jul. 5, 2022 (6 pages).
German Search Report corresponding to German Patent Application No. 10 2021 116 781.7, dated Apr. 5, 2022. (8 pages).

* cited by examiner

100

METHOD FOR CARRYING OUT A FUNCTION OF A VEHICLE, COMPUTER-READABLE MEDIUM, SYSTEM, AND VEHICLE

The present application is the U.S. national phase of PCT Application PCT/EP2022/058981 filed on Apr. 5, 2022, which claims priority of German patent application No. 102021116781.7 filed on Jun. 30, 2021, which is incorporated herein by reference in its entirety.

TECHNICAL FIELD

The disclosure relates to performing a function of a vehicle, as well as methods and systems therefore.

BACKGROUND

From the prior art, methods are known that maximize the accuracy of a predicated departure time. As a result, the predicted departure time corresponds as often as possible to an actual departure time. Furthermore, it is known from the prior art to link and/or carry out an action with each predicted departure time.

It is therefore an object of the disclosure to efficiently improve a performance of a function of the vehicle. In particular, it is an object of the disclosure to efficiently improve a prediction of a start of a next journey with the vehicle and the performance of a function of the vehicle depending on the start of the next journey with the vehicle.

SUMMARY

This object, among others, is achieved by the features of at least some of the embodiments described herein.

A first aspect a method for performing a function of a vehicle. The method may be a computer-implemented method and/or a control unit implemented method. The function of the vehicle can be a customer function of the vehicle. A customer function of the vehicle can be a function of the vehicle that can be operated and/or experienced by a user of the vehicle. The vehicle can be a motor vehicle. The method includes determining a current vehicle location of the vehicle. Furthermore, the method includes determining a probability of a start of a next journey within a time window from a set of time windows depending on the determined current vehicle location. The time window can be a time window with a fixed, predetermined time duration. For example, the time window can be 30 minutes long and contain the time between 5:00 p.m. and 5:30 p.m.

The method further includes a prediction of a departure time window for the start of the next journey, wherein the departure time window for the start of the next journey is the time window for which the determined probability has the highest value. Finally, the method includes performing the function of the vehicle if the determined probability of the predicted departure time window exceeds a predefined threshold value.

Advantageously, the method can predict a departure time window efficiently. Furthermore, the method can efficiently control a function of the vehicle depending on the predicted departure time window.

According to a first advantageous embodiment, the current vehicle location can be determined using a position of the vehicle, and/or the position of the vehicle can be determined by means of a global satellite navigation system.

According to a further advantageous embodiment, the probability P for a start of a next journey within a time window from the set of time windows can be determined depending on the determined current vehicle location as follows: P (start of the next journey in time window F, if the vehicle is stationary at a time t at the vehicle location A)=the number of past events in which the vehicle was stationary at time t at the vehicle location A and the start of the journey took place in time window F/(the number of past events in which the vehicle was stationary at the time t at vehicle location A and the start of the journey took place in the time window F+parameter k), wherein the parameter k is a non-negative real number. The parameter k can reduce the probability of starting the next journey. This can prevent the probability of starting the next journey from being estimated as too high. This can occur, for example, if there are only a few records of past journeys made by the user of the vehicle. The parameter k can be determined on a user-specific basis. Alternatively, the parameter k can be determined for all users of the vehicle. This makes it possible to efficiently determine the probability of starting the next journey within a time window.

According to yet a further advantageous embodiment, the parameter k can be determined using a cost function. This allows the parameter k to be determined efficiently.

According to a still further advantageous embodiment, the parameter k can be determined using a parameter optimization method. This allows the parameter k to be determined efficiently.

Moreover, the cost function may be determined depending on two parameters, and/or a first parameter may be representative of a proportion of all journeys for which the determined probability exceeds the predefined threshold value and/or the second parameter may be representative of a number of journeys in which the determined probability of the predicted departure time window exceeds the predefined threshold value and the start of the journey is within the determined time window, divided by a number of predicted departure time windows for which the probability exceeds the predefined threshold value. The parameter can be determined efficiently using the cost function.

According to a further embodiment, the function of the vehicle may be performed with a time delay, and/or the function of the vehicle may be performed with a time delay depending on the function and/or the predicted departure time window, and/or the function of the vehicle may be performed with a time delay depending on a current traffic situation. This allows the performance of the function to be controlled flexibly.

In some embodiments, the function of the vehicle may include the transmission of a message to a user of the vehicle, and/or conditioning and/or preconditioning the vehicle for the next journey. This allows various vehicle functions to be controlled efficiently.

A further aspect is a computer-readable medium for performing a function of a vehicle, wherein the computer-readable medium contains instructions which, when executed on a computer and/or a control unit of the vehicle, carry out the method described above.

A further aspect is a system for performing a function of a vehicle, wherein the system is designed to carry out the method described above.

Another aspect is a vehicle containing the system described above for performing a function of a vehicle.

Further features result from the claims, the figures and the description of the figures. All features and feature combinations mentioned above in the description as well as the features and feature combinations mentioned below in the description of the figures and/or shown in the figures alone can be used not only in the respective specified combination, but also in other combinations or on their own.

An exemplary embodiment is described below on the basis of the attached drawings. This results in further details, preferred embodiments and developments.

DETAILED DESCRIPTION

Figure 1:
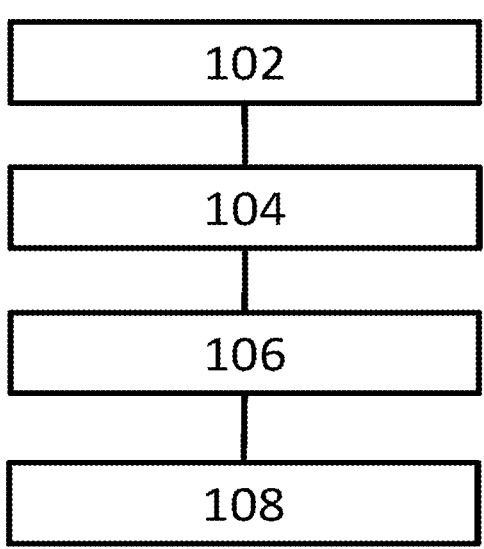
FIG. 1 shows an exemplary method for performing function of a vehicle.

In detail, FIG. 1 shows an exemplary method 100 for performing a function of a vehicle. The driving behavior of a user of a vehicle can only be predicted to a limited extent. For this reason, a function of a vehicle can only be performed if it is also highly likely to be relevant to the user of the vehicle. For example, relevance can be quantified and/or evaluated with the parameters of precision and hit frequency. In order to be able to predict the driving behavior of a user of the vehicle, a start of a next journey of the user of the vehicle can be predicted. Preferably, the method 100 is carried out at a time when the vehicle is parked. In addition or alternatively, the method 100 may be carried out at specified times and/or intervals while the vehicle is stationary and/or parked. The method 100 may be performed on a control unit and/or on a computer of the vehicle. In addition or alternatively, the method can be performed on a server external to the vehicle, such as a backend server.

The method 100 can determine a current vehicle location of the vehicle 102. The current vehicle location can be determined on the basis of a vehicle position, for example a last vehicle position of a last journey with the vehicle. The vehicle position can be determined by means of a global satellite navigation system. The vehicle position may vary at the vehicle location. For example, the vehicle position at the vehicle location can vary by 5 m, . . . , 50 m, . . . , 200 m. The vehicle position at the vehicle location may vary due to different parking locations of the vehicle at the vehicle location and/or due to an inaccuracy in determining the vehicle position. For example, the current vehicle location can be determined by calculating clusters of vehicle positions for all past vehicle positions. For example, a DBSCAN algorithm and/or agglomerative clustering can be used to compute clusters of vehicle positions, wherein each cluster represents a vehicle location. By using the last vehicle position of the vehicle, the cluster of vehicle positions can be determined and thus also the current vehicle location.

Further, The method 100 can determine a probability of a start of a next journey within a time window from a set of time windows depending on the determined current vehicle location 104. Once the vehicle is parked, the method 100 can determine a probability of a start of a next journey within a time window from a set of time windows depending on the determined current vehicle location using past journeys of a user of the vehicle. The probability P for the start of the next journey within a time window of a set of time windows can be determined as follows:

P(start of the next journey in time window F, if the vehicle is stationary at a time t at the vehicle location A)=the number of past events in which the vehicle was parked at time t at vehicle location A and the start of the journey took place in time window F/(the number of past events in which the vehicle was parked at the time t at the vehicle location A and the start of the journey took place in the time window F+parameter k), wherein the parameter k is a non-negative real number.

The parameter k can be adjusted depending on the number of events of a user, especially past events. A past event can be a past journey with the vehicle. The parameter k is preferably adjusted automatically by a cost function. For example, the parameter k can be increased if there are only a few events of the user. As a result, the probability of starting the next journey in time window F can be reduced. For example, the parameter k can be reduced if there are many events of the user. This can increase the probability of starting the next journey in time window F. The probability is compared against a predefined threshold value. By adjusting the parameter k, it is possible to control whether the threshold value falls above or below the predefined threshold value.

The number of past events can include all previous days of the week on which a journey with the vehicle took place. Alternatively, the number of past events can be limited to a current day of the week. In addition or alternatively, the number of past events can be limited to days of the week Monday to Friday, holidays, and/or days of a weekend. The number of time windows can be predetermined.

For example, the set of time windows can include time windows of a predetermined period of time, for example, a period of 24 after the vehicle is parked. An example time window may include a period from 8:00 a.m. to 8:30 a.m. on the following day after the vehicle has been parked.

The method 100 may predict 106 a departure time window for the start of the next journey. The departure time window for the start of the next journey may be the time window for which the determined probability has the highest value. The departure time window for a user can be predicted, for example, if a user-specific function of the vehicle is to be performed. Alternatively, the departure time window can be specified for all users of the vehicle if a function of the vehicle relevant to all users of the vehicle is to be performed.

The prediction 106 of the departure time window can be carried out by seeking a time window with a fixed duration, for example 30 min, preferably within a prediction horizon, for example, within a period of 24 hours, which has the highest probability for the start of the next journey. For example, the departure time window can be determined using fixed time windows from the end of the last journey. Alternatively, the departure time window can be determined on the basis of time windows of fixed duration, which are shifted by small time steps, for example in 5 min steps, at the end of the last journey. If there are multiple time windows within the prediction horizon where the probability is above the predefined threshold value, the time window with the highest probability can be predicted or all determined time windows can be predicted.

The duration of the time window can be chosen depending on the function of the vehicle that is to be performed. A short-duration time window may more accurately predict a departure time, but the probability of the start of the next journey may be lower in the short-duration time window than in a longer-duration time window. In addition or alternatively, in a first step an attempt can be made to determine a departure time within a time window of short duration and, if no departure time window has been found with a probability that exceeds the predefined threshold value, the time window can be gradually extended up to a specified maximum duration. For example, an initial time window of 30 min can first be extended to a time window of 60 minutes, then to a time window of 90 minutes, and finally to a time window of a maximum of 120 minutes.

The prediction of the departure time window can be carried out again at regular intervals if the vehicle is not moved. The probabilities of departure time windows can change over time. For example, the probability that the next journey will take place to work the next morning may be lower if the vehicle was parked at 5:00 p.m. the day before and there is still a possibility that another journey will take place in the evening.

If the prediction of the departure time window is carried out in the vehicle, the vehicle would have to be woken up at a later time for a new prediction. This can be prevented by predicting the departure time window for future times when the vehicle is parked, assuming that the vehicle will not be moved until the future time. If the vehicle is parked at 5:00 p.m., for example, the departure time window can be pre-predicted for the future times 5:10 p.m., 5:20 p.m., . . . , up to a maximum time horizon of, for example, 24 hours, in each case assuming that the vehicle has not yet been moved by that time. The prediction of the departure time window can end as soon as a time window is found with a probability above the threshold value. If, contrary to the assumption, the vehicle is moved at an earlier time, a function scheduled for a later date will be discarded. Similarly, this procedure can also be carried out when the departure time window is predicated in a server external to the vehicle.

The method 100 can perform 108 the function of the vehicle if the determined probability of the predicted departure time window exceeds a predefined threshold value. For example, the predefined threshold value may include a value of 0.6, 0.7, 0.8, or 0.9. The function of the vehicle s preferably only performed if the probability of the predicted departure time window exceeds a predefined threshold value. If the probability of the predicted departure time window is above the threshold value, the function can be performed at a later time, wherein the later time is a time between a current time and the determined departure time window. Further, the later time may depend on the function of the vehicle to be carried out. If the function is, for example, a check of the traffic situation and/or conditioning of the vehicle, the function can be performed 30 minutes or 60 minutes before the predicted start of the journey, for example.

The parameter k can be determined by means of parameter optimization. Preferably, the parameter optimization is carried out by means of a cost function. By means of the cost function, different value assignments of the parameter k can be evaluated on the basis of two parameters. As described above, the parameter k is used when determining the probability P. Parameter optimization can use historical data, such as a departure point and/or a departure time of a user journey with the vehicle. The historical data can be used as test data for the evaluation of the parameter k with the cost function. During the parameter optimization, the cost function is calculated for different value assignments of the parameter k. The value assignment of the parameter k that maximizes the cost function is used. In order to determine the parameter k as efficiently as possible, an algorithm can be used for parameter optimization such as raster search, random search or Bayesian optimization. Parameter optimization can be further accelerated by using a representative sample of users, such as 1000 selected users.

In order to calculate the cost function, two parameters, precision and hit frequency, can first be calculated for different probability threshold values. The characteristic hit frequency is also referred to as recall below. For example, the calculation can be carried out for probability threshold values 0, 0.01, 0.02, . . . , 1. The parameter recall can be defined as the proportion of all journeys for which the probability is above the predefined threshold value and the start of the journey is within the predicted time window. The parameter precision can be defined as follows: Number of journeys for which the probability is above the threshold value and a start of the journey is in the predicted time window, divided by the number of predictions for which the probability is above the predefined threshold value. In other words, the precision indicates the probability that a journey will actually start within a predicted departure time window.

Figure 2:
FIG. 2 shows an exemplary profile of two parameters of a cost function.
Figure 2:
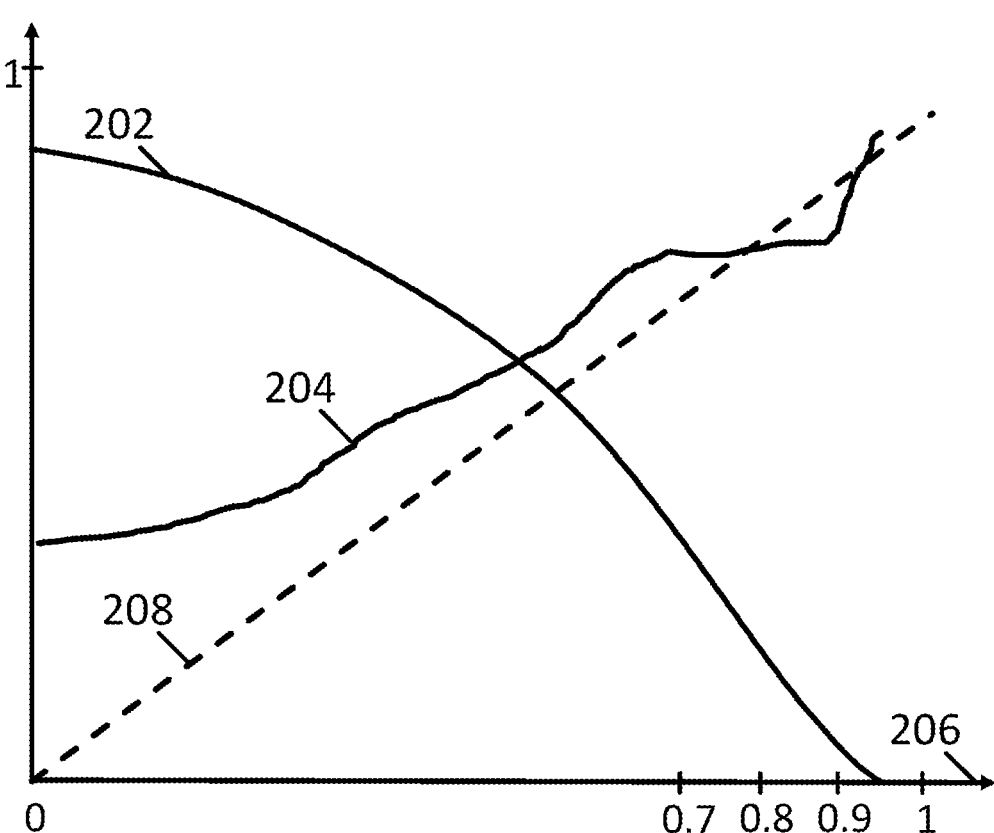

In detail, FIG. 2 shows an exemplary profile 200 of the parameters recall 202 and precision 204 of the cost function as a function of the probability threshold value 206. As shown in FIG. 2, the precision 204 is above the diagonal 208, provided that the estimated probabilities agree with the actual accuracy.

Figure 3:
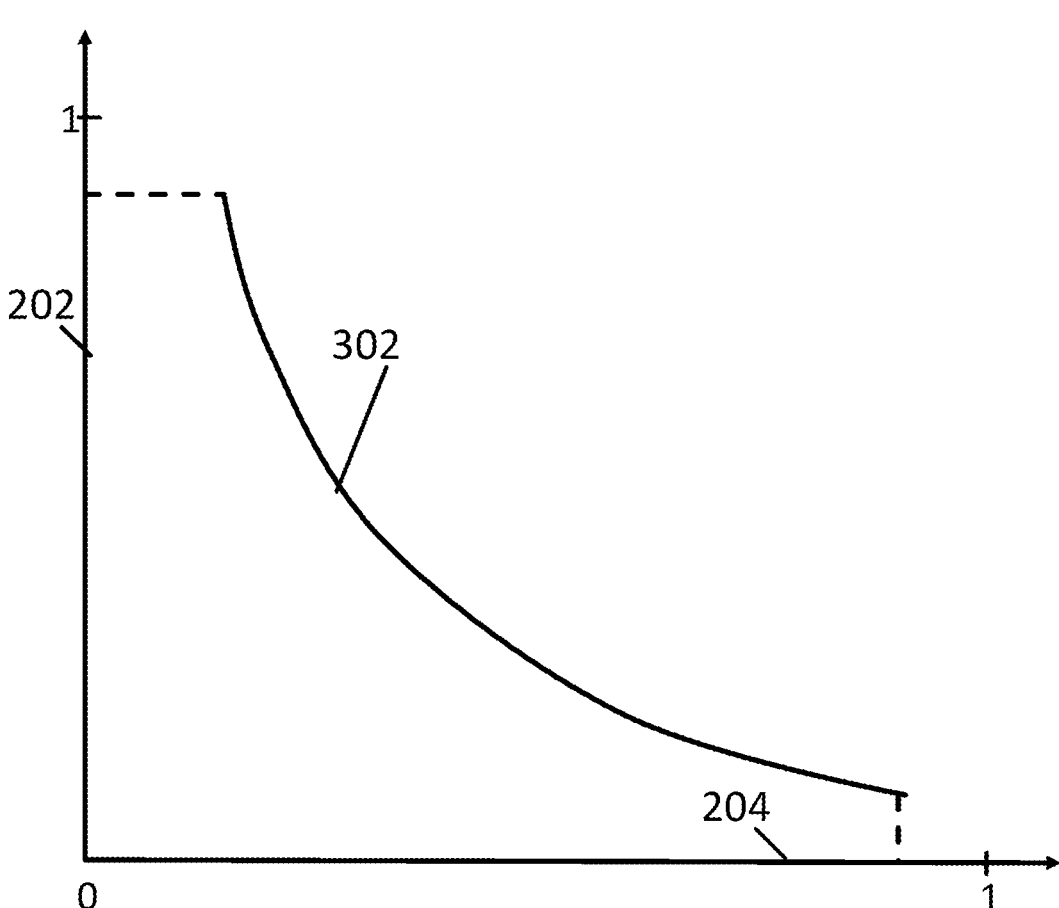
FIG. 3 shows an exemplary profile of a dependence of a first parameter on a second parameter of a cost function.

In detail, FIG. 3 shows a profile 300 of a dependence of a first parameter, the parameter recall 202, on a second parameter, the parameter precision 204, of the cost function. For example, the following can be selected as cost functions:

1) Recall for a defined precision, for example a precision of 0.7,

2) The area under the recall/precision curve 302. The dashed lines in FIG. 3 are used to illustrate how the area is calculated if the curve does not cover the entire range from 0 to 1 for the recall and/or precision.

3) As described under 2), however, the area is not defined over the entire precision value range of O to 1, but over an interval such as 0.5 to 0.8.

Furthermore, a threshold value for a function can be predefined for all users of the vehicle. In addition or alternatively, a threshold value for a function can be specified for each user of the vehicle. When using the cost function 1), the probability threshold value of the required precision corresponds the preferably to predefined threshold value for performing the function of the vehicle. This makes it possible to achieve the required precision for all users of the vehicle in the future. If the cost function is optimized per user, this results in an individual minimum threshold value for each user for performing the function.

The variant 2) or 3) of the cost function can be used if, at the time of parameter optimization, it is not yet clear exactly what precision will be required later. For example, the precision can be dynamically adjusted by a user. The assignment of threshold value to precision resulting from the calculation—i.e. which precision is achieved with which threshold value—can be used to dynamically change the threshold value and thus achieve a defined precision per user or for all users without having to readjust the parameter k. Variant 1) of the cost function can achieve better results. Variants 2) and 3) of the cost function increase the flexibility.

REFERENCE SIGN LIST

100 Method
102 Determine a current vehicle location
104 Determine a probability
106 Predict a departure time window
108 Perform a function of the vehicle
200 Profile of two parameters
202 Recall 204 Precision
206 Probability threshold values
208 Diagonal
300 Profile
302 Recall/Precision Curve

The invention claimed is:

1. A method for performing a function of a vehicle, the method including:

determining a current vehicle location of the vehicle;

determining a probability of a start of a next journey within a time window for each of a set of time windows depending on the determined current vehicle location;

predicting a departure time window for the start of the next journey, wherein the departure time window for the start of the next journey is a time window of the set of time windows for which the determined probability has a highest value; and performing the function of the vehicle if the determined probability of the predicted departure time window exceeds a predetermined threshold value; and wherein determining the probability of the start of the next journey within the time window for each of the set of time windows further comprises determining a probability value P of a start of the next journey in a time window F, if the vehicle is stationary at a time t at a vehicle location A, which is equal to a number of past events in which the vehicle was parked at the time t at the vehicle location A and the start of a past journey took place in the time window F divided by a number of past events in which the vehicle was parked at the time t at the vehicle location A and the start of a past journey took place in the time window F plus parameter k, and wherein the parameter k is a non-negative real number.

2. The method as claimed in claim 1, wherein determining the current vehicle location includes using a position of the vehicle determined by a global satellite navigation system.

3. The method as claimed in claim 1, further comprising determining the parameter k using a cost function.

4. The method as claimed in claim 3, further comprising determining the parameter k using a parameter optimization method.

5. The method as claimed in claim 3, wherein the cost function is determined depending on two parameters, wherein a first parameter is representative of a proportion of all journeys for which the determined probability of the predicted departure time window exceeds the predetermined threshold value, and wherein a second parameter is representative of a number of journeys for which the determined probability of the predicted departure time window exceeds the predetermined threshold value and the start of the journey is within the determined time window, divided by a number of predicted departure time windows for which the probability exceeds the predetermined threshold value.

6. The method as claimed in claim 1, wherein the function of the vehicle is performed with a time delay.

7. The method as claimed in claim 6, wherein the time delay depends on the function.

8. The method as claimed in claim 6, wherein the time delay depends on the predicted departure time window.

9. The method as claimed in claim 6, wherein the time delay depends on a current traffic situation.

10. The method as claimed in claim 1, wherein the function of the vehicle includes a transmission of a message to a user of the vehicle.

11. The method as claimed in claim 1, wherein the function of the vehicle includes conditioning of the vehicle for the next journey.

12. The method as claimed in claim 11, further comprising determining the parameter k using a cost function.

13. The method as claimed in claim 12, further comprising determining the parameter k using a parameter optimization method.

14. A computer-readable medium for performing a function of a vehicle, wherein the computer-readable medium contains instructions which, when executed on a computer, carry out the method as claimed in claim 1.

15. A non-transitory computer-readable medium for performing a function of a vehicle, wherein the computer-readable medium contains instructions which, when executed on a control unit of the vehicle, carry out the method as claimed in claim 1.

16. A system for performing a function of a vehicle, wherein the system is designed to carry out the method as claimed in claim 1.

17. A vehicle containing a system for performing a function of a vehicle as claimed in claim 16.

18. The method as claimed in claim 1, wherein determining the probability of the start of the next journey within the time window for each of the set of time windows comprises determining the probability of the start of the next journey from the current vehicle location within the time window for each of the set of time windows.

19. The method as claimed in claim 8, wherein the time delay depends on a current traffic situation.

20. The method as claimed in claim 19, wherein the function of the vehicle includes conditioning of the vehicle for the next journey.

* * * * *